United States Patent [19]

Appel

[11] Patent Number: 4,606,697

[45] Date of Patent: Aug. 19, 1986

[54] WIND TURBINE GENERATOR

[75] Inventor: Gerhard H. Appel, San Pedro, Calif.

[73] Assignee: Advance Energy Conversion Corporation, Torrance, Calif.

[21] Appl. No.: 641,016

[22] Filed: Aug. 15, 1984

[51] Int. Cl.[4] .............................................. F03D 3/02
[52] U.S. Cl. ....................................... 415/2 R; 415/3; 415/60; 416/121; 416/122
[58] Field of Search ............................ 415/2 R–4 R, 415/60, 65, 64; 416/122 A

[56] References Cited

U.S. PATENT DOCUMENTS

| | | | |
|---|---|---|---|
| 419,345 | 1/1890 | Otto | 416/122 A |
| 2,335,817 | 11/1943 | Topalov | 415/2 R |
| 2,373,207 | 4/1945 | Touhey | 415/2 R X |
| 2,379,324 | 6/1945 | Topalov | 415/3 R |
| 3,928,771 | 12/1975 | Straumsnes | 415/2 R |
| 4,017,204 | 4/1977 | Sellman | 415/2 R |
| 4,037,983 | 7/1977 | Poeta | 415/2 R |
| 4,074,951 | 2/1978 | Hudson | 416/122 A X |
| 4,084,918 | 4/1978 | Pavlecka | 416/122 A X |
| 4,088,419 | 5/1978 | Hope et al. | 416/122 A X |
| 4,156,580 | 5/1979 | Pohl | 416/122 A X |
| 4,174,923 | 11/1979 | Williamson | 416/122 A X |
| 4,204,126 | 5/1980 | Diggs | 415/4 R |
| 4,206,126 | 5/1980 | Diggs | 416/122 A X |
| 4,474,529 | 10/1984 | Kinsey | 415/2 R |

FOREIGN PATENT DOCUMENTS

| | | | |
|---|---|---|---|
| 1124181 | 5/1982 | Canada | 416/122 A |
| 453231 | 12/1927 | Fed. Rep. of Germany | 416/122 A |
| 2451751 | 5/1976 | Fed. Rep. of Germany | 415/2 R |
| 2539058 | 3/1977 | Fed. Rep. of Germany | 415/4 R |
| 651354 | 2/1929 | France | 416/122 A |
| 900038 | 6/1945 | France | 416/122 A |
| 2300235 | 10/1976 | France | 415/3 R |
| 2509384 | 1/1983 | France | 416/122 A |
| 2520813 | 8/1983 | France | 416/122 A |
| 138466 | 10/1981 | Japan | 415/4 R |
| 1518151 | 7/1978 | United Kingdom | 416/176 A |

Primary Examiner—Everette A. Powell, Jr.
Attorney, Agent, or Firm—Georges A. Maxwell

[57] ABSTRACT

A wind-powered prime mover comprising a pair of elongate, vertically extending, laterally spaced parallel rotors with a plurality of circumferentially spaced radially outwardly projecting circumferentially and longitudinally extending vanes. The rotors are arranged so that the vanes of each rotor projects between adjacent pairs of vanes of the other rotor as the rotors rotate. The rotors are rotatably supported atop a turn-table which turns to dispose the lateral plane on which the axes of the rotors occur at right angle to prevailing wind. Wind directing shrouds are engaged about the lateral outside halves of the rotors and function to direct wind from said outer halves of the rotors laterally inward toward and between the lateral inner halves of the rotors. The windward sides of the shrouds define a wind gate through which wind moves into engagement with the rotors and are pivotally movable to increase and decrease the lateral extent of the wind gate to throttle the wind, as desired.

12 Claims, 10 Drawing Figures

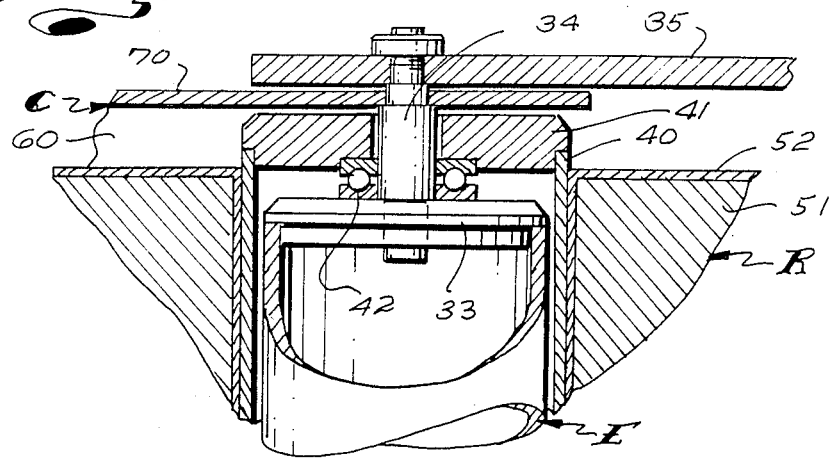
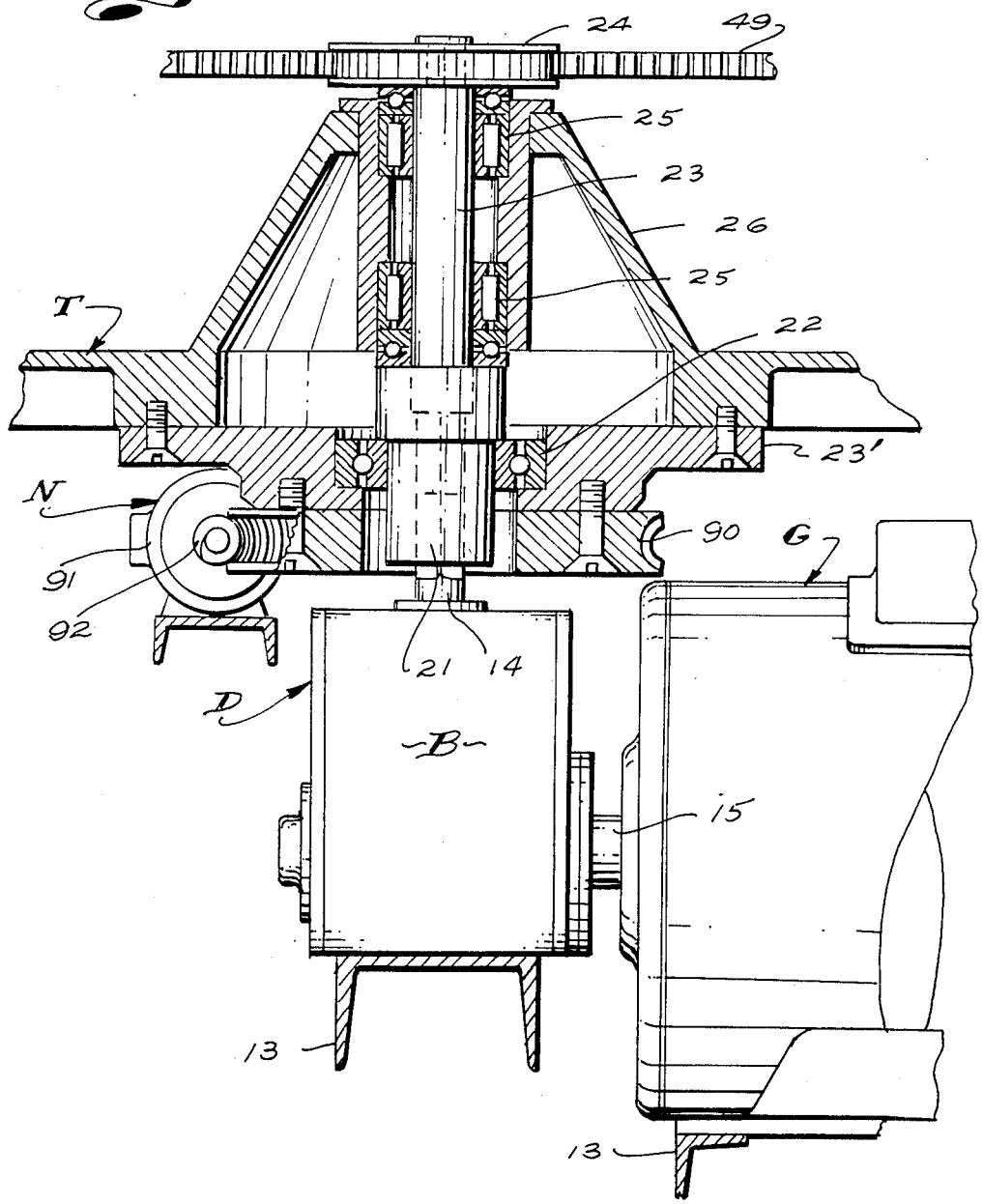

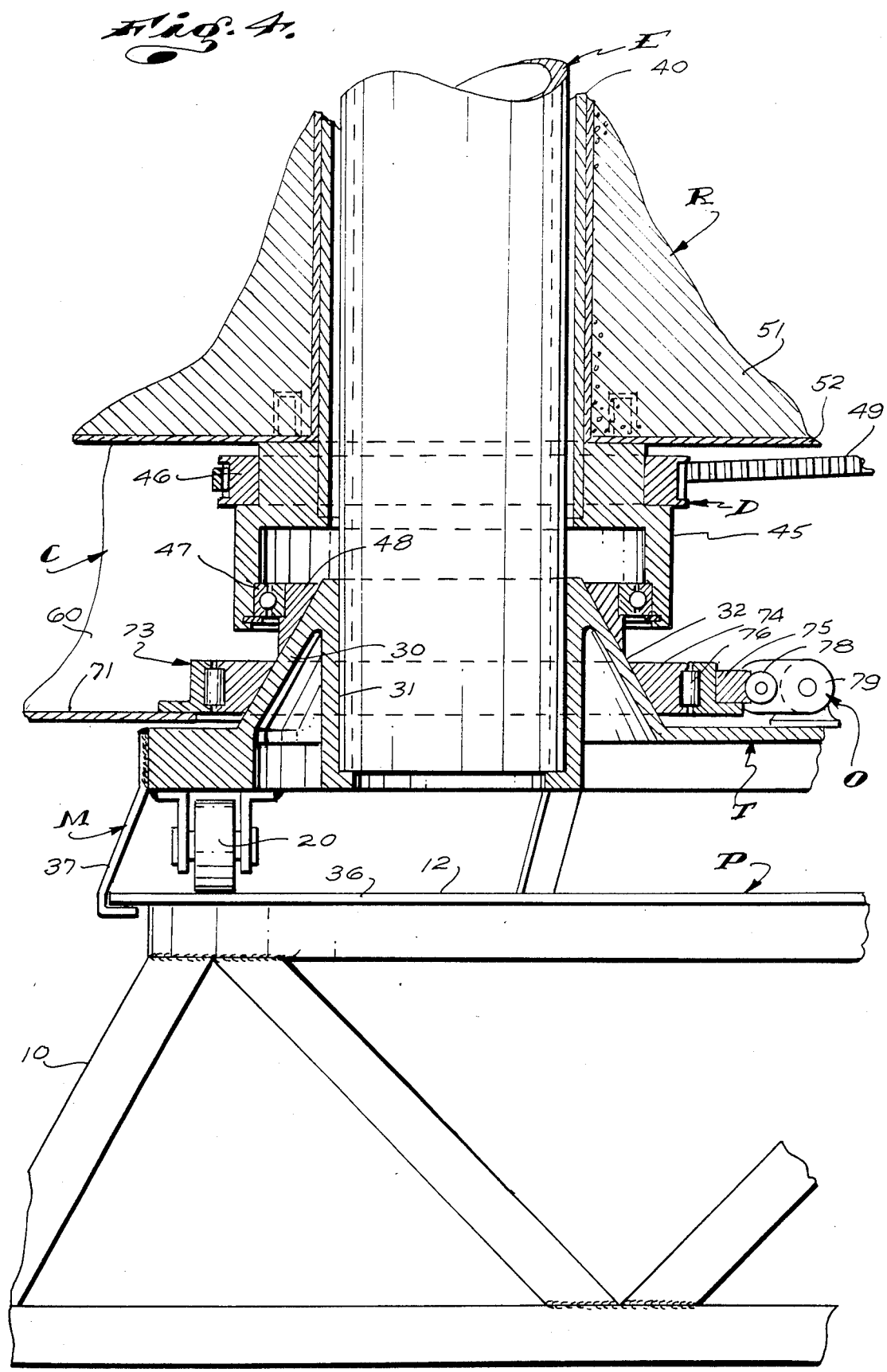

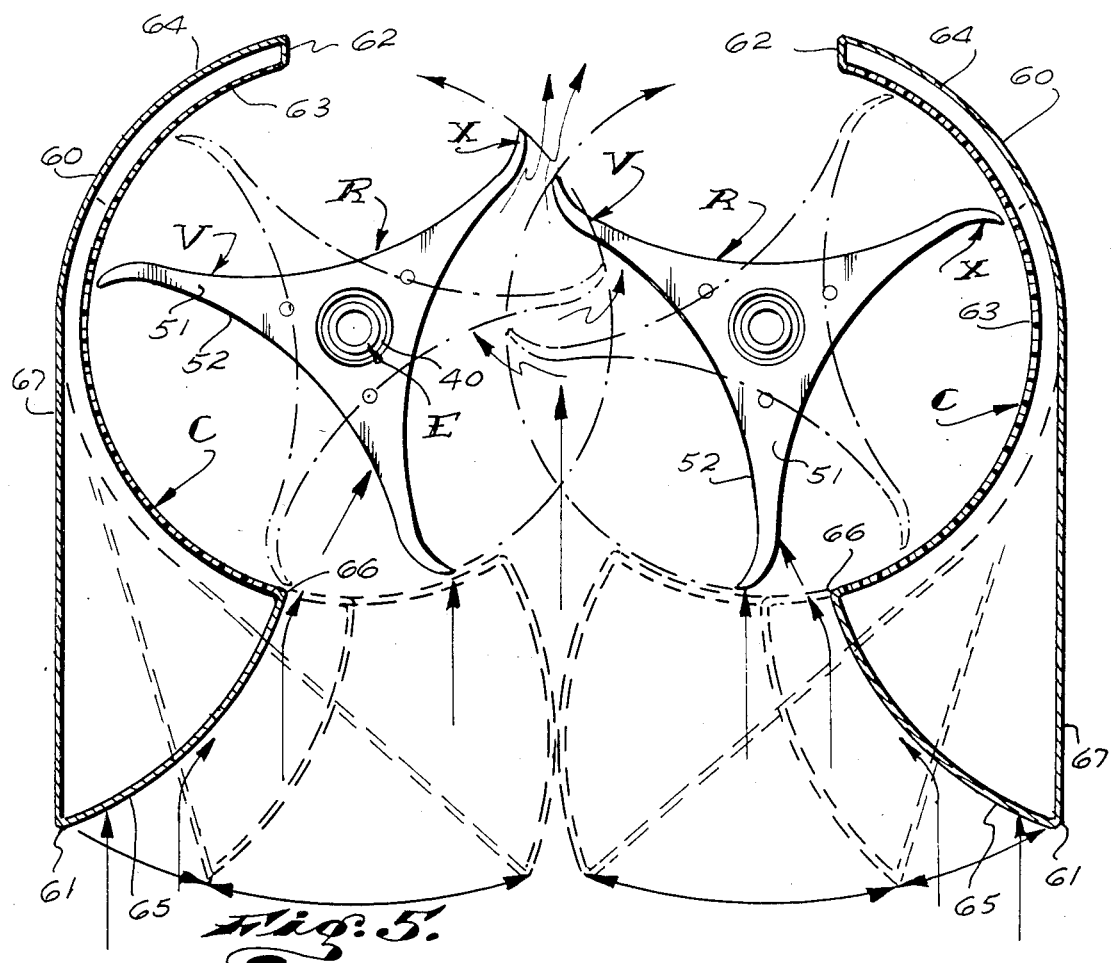
Fig. 5.
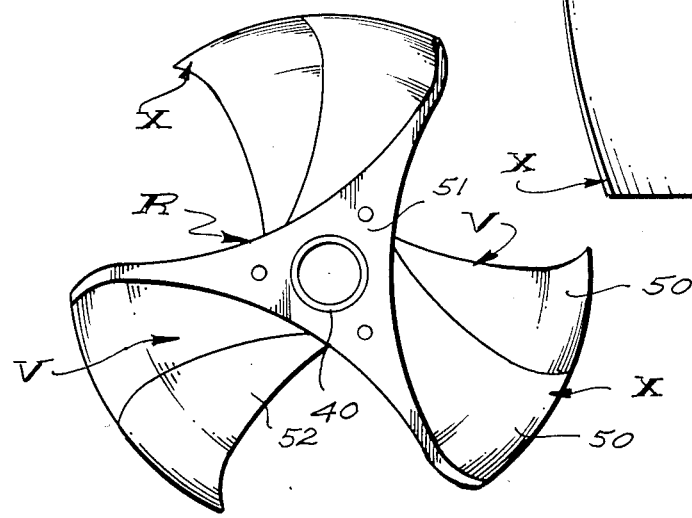
Fig. 6.
Fig. 7.

WIND TURBINE GENERATOR

BACKGROUND OF THE INVENTION

The art of wind-powered prime movers which operate to put the work energy of wind to useful work is extremely old and highly developed.

Apart from wings and sails, there are two common or basic classes of wind-powered prime movers. The first and most familiar class of wind-powered prime movers include and are characterized by rotatable propellers or fans, the rotative axes of which are substantially parallel with the direction of the movement of the air or wind relative thereto and which include pluralities of elongate, circumferentially spaced substantially radially extending blades or vanes which extend outward from the rotative axes of the propellers or fans on radial planes which are substantially normal to the direction of movement of air. The blades or vanes are pitched and/or aerodynamically formed so that the impingement and movement of wind or moving air upon and about them causes the propellers or fans to rotate. The second and also quite familiar class of wind-powered prime movers include rotors, the rotative axes of which are substantially normal to the direction of the movement of air and which include and are characterized by pluralities of circumferentially spaced elongate vanes projecting and/or spaced radially outward from and which extend substantially parallel with the rotative axes of the rotors and which are pitched and/or aerodynamically formed so that wind or air moving by the rotors and across the vanes causes the rotors to rotate.

While the second noted class of wind-powered prime movers, which are characterized by rotors rather than by propellers or fans, have certain characteristics or attributes that appear to make their adoption and use in wind-powered prime movers advantageous, they have, prior to my invention, proven to afford less latitude in design than do propellers and/or fans and have a number of inherent design and/or structural limitations which have led the prior art to avoid the use thereof and to pursue the development and use of propellers or fan type wind-powered prime movers in preference thereto.

In the case of both of the above noted classes of wind-powered prime movers, it is understood and believed that in excess of eighty percent of the energy of the wind or moving air that engages and acts upon the blades and/or vanes of the fans and rotors is not captured and put to use, but is lost as a result of the deflection of the air and the slipping of that air from the tips and/or trailing edges of the blades and vanes. The deflection or changing of the direction of the moving air wastefully consumes much of the energy carried by the air and when the redirected air slips from or leaves the blades and/or vanes, the energy carried by or within that air is lost. Accordingly, under the best circumstances and conditions, wind-powered prime movers are very inefficient.

Another shortcoming found to exist in wind-powered prime movers provided by the prior art resides in the fact that little or no control of the speed of rotation is afforded. Such prime movers, due to their inherent inefficiencies, are commonly designed to turn as freely and as fast as the wind might drive them, whereby as much work energy as possible can be collected by them. As a result of such practices, when there is little wind most wind-powered prime movers turn at speeds below desired or optimum speed and when there is strong wind, they often turn at speeds which are in excess of desired or optimum speed with respect to the various machines or devices they drive or power.

The foregoing is particularly true in the case of those exceedingly large windmill or propellr type wind-powered prime movers which have been constructed in recent years for generating electric power. In the case of those large propeller type electric powered generating wind-powered prime movers, the aerodynamic shape and structural characteristics of the propellers must be established for most effective and efficient operation when worked upon by the mean or average prevailing wind in the areas in which the structures are used. The latitude for design is therefore quite limited. When such structures are acted upon by winds that are notably greater or stronger than the average wind they are designed to be operated by, the strong winds frequently result in overstressing and subjecting the blades to destructive forces which cannot be avoided by feathering the blades and which are greatly increased by braking or otherwise forcibly slowing rotation of the propellers.

OBJECTS AND FEATURES OF MY INVENTION

It is an object of my invention to provide a novel wind-powered powered prime mover comprising a pair of interrelated wind-driven rotors and novel wind flow control means to direct and control the flow and movement of wind (moving air) relative to the rotors.

It is an object and feature of my invention to provide a prime mover of the general character referred to above wherein the pair of rotors are on laterally spaced parallel axes normal to the direction of the movement of the wind working upon them and wherein the wind flow control means directs wind flowing to the prime mover between said rotors to cause counter rotation thereof.

Yet another object and feature of my invention is to provide a prime mover of the general character referred to above wherein each of the rotors has a plurality of circumferentially spaced, radially outwardly projecting, longitudinally extending vanes, each of which vanes, on each rotor, advances with and between adjacent pairs of vanes on the other rotor in the direction of the wind moving between the rotors and so that wind or air slipping from the vanes on each rotor is directed onto and works upon a vane of the other rotor. Thus, a portion of the unspent energy of that air slipping from each vane of each rotor and working upon a vane of the other rotor is imparted into the other rotor, thereby materially increasing the efficiency of the prime mover to receive the energy of the wind and put it to useful work.

Still another object and feature of my invention is to provide an improved wind-powered prime mover of the general character referred to above wherein the counter rotating interengaged vanes are airfoil shaped and are spaced and rotated in timed relationship relative to each other, whereby wind moving by their foil shape affords lifts on the vanes which urges them in their normal direction of rotation and the spacing of interengaged vanes establishes slots which direct and conduct the wind effectively and efficiently relative to the vanes.

It is another object and feature of my invention to provide an improved wind-powered prime mover of the general character referred to above wherein the vanes on the rotors are helically pitched longitudinally of the axis of the rotors, whereby the rotors are moved uniformly by the wind acting upon them, free of pulsation, and wherein the cross-sectional area of the airfoil shape thereof extends radially outwardly and longitudinally in the direction in which the air tends to slip over them, whereby increased or maximum airfoil surface area effective to turn the rotors is provided.

Yet another object and feature of my invention is to provide a wind-powered prime mover of the general character referred to in the foregoing, wherein the wind flow control means operates to collect, accelerate and direct prevailing wind onto and between the rotors and operates to allow for expansion and free movement of energy depleted air from between the rotors.

A further object and feature of my invention is to provide a wind flow control means of the general character referred to which is operable to throttle and control the volume and mass of air advanced to and between the rotors and to thereby easily and effectively control the operating speed of the prime mover throughout a wide range of wind speeds.

Finally, it is an object and feature of my invention to provide a novel wind-powered prime mover of the character referred wherein the wind flow control means shrouds the outer sides of the rotors where the vanes advance counter to the direction of the movement of wind and which functions to relieve air pressure between those vanes, whereby those vanes and the air related to them affords little resistance to the rotation of the rotors.

The foregoing and other objects and features of my invention will be fully understood from the following detailed description of one typical preferred form and embodiment of my invention, throughout which description reference is made to the accompanying drawings.

DESCRIPTION OF THE DRAWINGS FIG. 1 is a front view of the invention; FIG. 2 is an enlarged sectional view of my upper rotor support structure;

FIG. 3 is an enlarged sectional view of my power transmission structure;

FIG. 4 is an enlarged sectional view of my lower rotor support structure;

FIG. 5 is a sectional view taken substantially as indicated by line 5—5 on FIG. 1;

FIG. 6 is an axial end view of a rotor section; and

FIG. 7 is a side view of the rotor section shown in FIG. 6.

DESCRIPTION OF THE INVENTION

Figure 1:
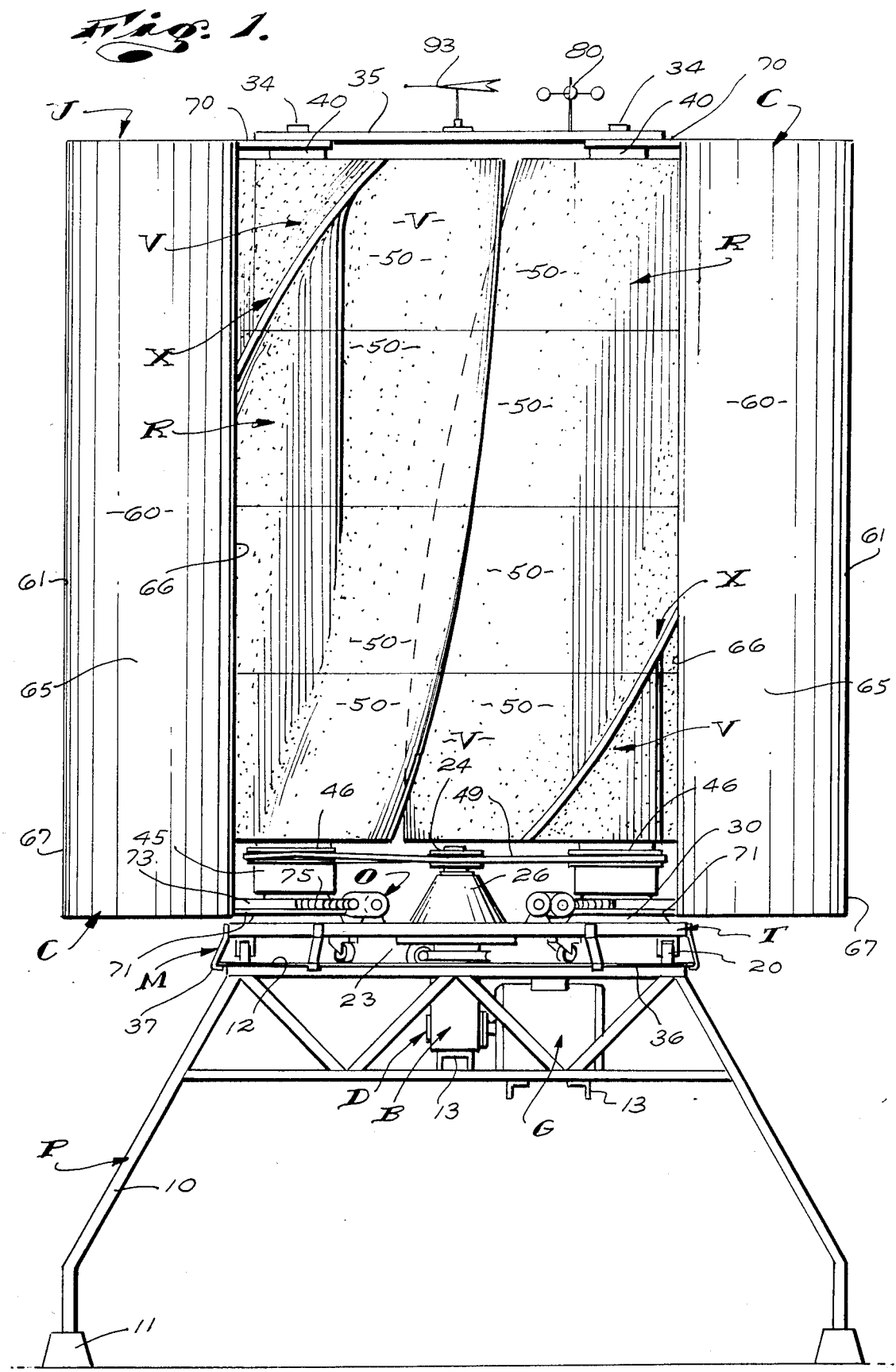

In the form of my invention shown in the drawings, the wind-powered prime mover is a large, vertically standing, stationary, electric power generating unit U. The unit U is characterized by a ground engaging pedestal P, a turn table T rotatably supported atop the pedestal, a pair of elongate, vertical, laterally spaced, parallel rotors R rotatably supported atop the turn table and wind or air flow control means C carried by the turn table and related to the rotors.

In addition to the foregoing, the unit U includes a dynamo electric machine or power generator G carried by the pedestal P and power transmission or drive means D between the rotors R and the generator G.

The pedestal P can vary widely in details of construction and is shown as a vertically extending derrick like structure fabricated of steel and characterized by substantially vertically extending legs 10 with lower ends fixed to footings 11 set in the earth and an open framework at and between the upper ends of the legs defining a horizontal, upwardly disposed annular load-supporting track 12 and including a number of load-supporting members 13 in the form of channels, angles and the like and which support the generator G and parts of the drive means D. In a typical embodiment of my invention, the pedesatal P might be 30 feet high and the annular track 12, at the top thereof, might be in excess of 30 feet in diameter.

In the form of my invention shown in the drawings, the drive means D includes a gear box B with a vertical, upwardly projecting input shaft 14. The box B is mounted within the framework of the pedestal P with its shaft 14 concentric with the track 12 and projecting upwardly toward the plane of the track. The shaft 14 serves as a pilot part for the turn table T and maintains the table T concentric with the track 12, as will be apparent from a study of the drawings.

The gear box B has a horizontal, laterally projecting output shaft 15 which is suitably coupled with the drive or input shaft of the generator G. The generator G is mounted within the framework of the pedestal adjacent the box B substantially as shown. In the drawings, and for the purpose of simplifying this disclosure, I have shown the shaft 15 of the box B and the drive shaft of the generator G as a common shaft.

The turn table T is a flat, horizontal cast metal and/or fabricated steel unit, substantially disc-shaped in plan configuration and substantially equal in diametric extent with the diameter of the track 12. The turn table T is positioned in vertical spaced concentric relationship with and above the track 12. The table T has a plurality of circumferentially spaced support rollers or wheels 20 carried by and depending from its outer perimeter portion and engaging the track 12.

The table T is next provided with a central bearing means which is rotatably engaged with the shaft 14 of the gear box B. The bearing means can vary widely in practice and as shown as including a central shaft-like coupler 21 rotatably supported within a central opening in the table T by an anti-friction bearing 22. The bearing 22 is carried by an apertured central plate 23 fastened to the bottom of the platform. The coupler 21 has a downwardly opening central polygonal opening and the shaft 14 has an upper polygonal end portion slidably engaged in and establishing rotary driving engagement with the coupler.

With the above relationship of parts, it will be apparent that the coupler 21 is maintained concentric with the trck 12 and table T by the shaft 14 and that the table T is freely rotatable about or relative to the coupler. Further, the coupler is rotatable relative to the table T and with the shaft 14.

At this time, it should be noted that the drive means D includes a central shaft 23 coupled with and projecting up from the coupler 21 and a (belt gear) driven wheel 24 at the upper end of the shaft 23, above the top plane of the table T. The central shaft 23 is rotatably carried by an anti-friction bearing assembly 25 which is shown engaged in and carried by an upwardly projecting cone shaped bearing housing 26 at the center of the turn table.

The turn table T next includes a pair of laterally spaced vertical, upwardly projecting truncated bearing cones at diametrically opposite sides of the central axis of the table and at the outer peripheral portion thereof (see FIG. 4 of the drawings). The truncated bearing cones 30 have central upwardly opening sockets 31 in which the lower end portions of a pair of elongate verticalsupport columns E are securely set. The columns E project freely upwardly from the platform. The columns E are lightweight tubular metal parts of sufficient wall thickness and diametric extent to afford necessary and desired support for the rotors R, as will hereinafter be described. The cones 30 are characterized by and defined radially inwardly and upwardly convergent exterior conical surfaces 32.

The upper ends of the tubular columns E are closed by caps or plates 33. The plates 33 carry central vertical upwardly projecting bearing spindles 34 (see FIG. 2 of the drawings). The upper ends of the two spindles, at the upper ends of the pair of columns, are coupled together by an elongate, flat, transversely extending header 35, substantially as shown in FIG. 1 and 2 of the drawings, whereby the upper ends of the columns are maintained in fixed spaced relationship with each other.

Finally, the table T is provided with retaining means M to prevent it from lifting and otherwise becoming misaligned with the track 12 of the pedestal P.

The means M can vary widely in form and construction. In the form of the invention illustrated, the means M includes an annular radially outwardly projecting retaining flange 36 about the perimeter of the track 12 and a plurality of circumferentially spaced hook-like retainers 37 fixed to the outer periphery of the turn table T and normally establishing free running hooked engagement about the flange 36.

The pair of rotors R are elongate, vertically extending parts rotatably carried by the pair of columns E on the turn table T. The rotors have elongate, central, tubular hubs 40 through which the columns E extend with free running clearance. The upper ends of the hubs 40 are closed by and carry apertured plates or caps 41 through which the spindles 34 on the plates 33 at the tops of the columns E freely project. The caps 41 occur in spaced relationship with and between the plates 33 and the header 35 and are rotatably supported by anti-friction bearings 42 engaged about the spindles and between the caps and plates 41 and 33. Accordingly, with the combination and relationship of parts set forth in the foregoing, the hubs 40 of the rotors are rotatably supported at their upper ends, atop the columns E to depend downwarly and freely about the columns.

The lower ends of the hubs of the rotors carry annular mounting rings 45. The rings 45 carry drive (belt gear) wheels 46 and carry annular anti-friction bearings 47. The bearings 47 have outer races set in sockts in the rings 45 and have inner races which are engaged about and carried by seat rings 48 on the bearing cones 30. The rings 48 have tapered inner surfaces which establish mating seated engagement with the tapered surfaces 32 of their related cones 30. Thus, the lower ends of the tubular hubs 40 of the rotors R are bearing supported in concentric relationship with and about the columns E.

The drive wheels 46 of the rotors occur on suitable working planes with respect to the driven wheel 24 which occurs at and above the center of the table T.

The rotors R next include a plurality of circumferentially spaced longitudinally extending, radially outwardly projecting vanes V. In the form of my invention shown in the drawings, each rotor has three vanes V. The vanes V of each rotor are spaced equally or 120° apart, relative to each other, about the axis of the rotor.

The number of vanes can be varied as desired or as circumstances require.

The vanes V of each rotor R extend longitudinally of the hub 40 between the upper end of the hub and the ring 45 at the lower end of the rotor. The vanes V are pitched helically longitudinally and circumferentially of the rotor a circumferential extent substantially equal to the circumferential spacing of adjacent vanes. In the case illustrated, for example, the vanes are spaced 120° apart and are pitched longitudinally and circumferentially 120°.

The radial extent of the vanes V is slightly less than the lateral spacing or distance between the columns E, whereby the vanes of the two rotors establish free mesh-like engagement with each other when the rotors are rotated in counter rotation relative to each other. The rotors are circumferentially or rotatably set relative to each other with the vanes of one rotor circumferentially offset from the vanes of the other rotor approximately 60° relative to any common plane through the rotors and so that as they rotate together, the vanes V on each rotor move and advance freely, substantially midway between and with adjacent pairs of vanes of the other rotor.

In practice and as shown in the drawings, each rotor is preferably though not necessarily established of a plurality of axially aligned sections 50 engaged on and about their related tubular rotor hub 40. The sections 50 are pinned together in suitable axial alignment and against relative rotation. The lowermost section 50 is pinned in rotary driving engagement with the ring 45 upon which it is set and stopped. Each section 50 includes a molded or sculptured core 51 of lightweight structurally strong and dimensionally stable foam plastic material. The core 51 is covered with a smooth, strong and durable skin 52 of resin impregnated fabric, such as lightweight fiberglass or carbon fiber fabric. The skin covered core of each section has a central opening to accommodate the hub 40 and is sculptured or formed to impart the vanes V with desired airfoil shape.

With the above described construction, the rotors R can be made extremely light yet adequately strong and durable to assure that they will withstand the environment and operating conditions which they will or might be subject to during anticipated operation and/or use of the unit U.

By establishing the rotors in sections as noted above, forming an assembly of the rotors is made quite simple and economical.

In operation and use, the vanes V are only effectively acted upon by wind or moving air advancing rearwardly from the front to the rear of the unit U about and between the inner adjacent halves of the rotors. Accordingly, only those vanes V, advancing laterally inwardly rearwardly and thence laterally outwardly in and through that space between the cental axes and/or hub portions of the pair of rotors and which can and will hereinafter be called the "wind gate" in the construction, are acted upon by the wind to convert the energy of the wind into rotary motion in the rotors. As the vanes V advance laterally outwardly, forwardly and thence lateraly inwardly about the outer portions of the rotors, they perform no useful work and are at "idle".

In furtherance of my invention, the outer longitudinal edge portions X of the vanes V are curved circumferentially relative to the mean radial planes of the vanes and in the direction of rotation of the vanes, as clearly shown in the drawings. The curvature of the outer edge portions of the vanes is such that the outer edge portions of the vanes advance into working engagement in and with wind advancing into and through the wind gate of the construction before the mean radial planes of the vanes move circumferentially inwardly past the central fore and aft vertical planes of the rotors, thereby assuring that the wind will commence to work upon those portions of the vanes at the earliest possible point of time and advancing positioning of the vanes and in a manner to induce and drive the vanes over or past center with respect to the central vertical fore and aft planes of the rotors and to substantially eliminate back winding and/or stalling of the rotors. Further, the noted curvature of the outer edge portions X of the vanes V is preferably aerodynamically designed with respect to the longitudinal and circumferential pitch of the vanes so that the wind impinging and reacting upon the vanes if first caused to move and spread radially inwardly and longitudinally across the reactive surfaces of the vanes as they advance through their inner forward quarters of their rotative paths and assure the effective and efficient transfer of energy from the wind into the rotors.

In furtherance of the foregoing, it is to be particularly noted that the circumferential and longitudinal helical pitch of the vanes as described above and as illustrated in the drawings allows for and induces the moving air reacting upon the vanes to change direction and move longitudinally of the vanes as it spreads and slips relative thereto. Thus, the induced continued movement of the air, as noted above, eliminates the tendency and possibility of the moving air being stopped by the vanes of the rotors and to thereby build up as a random turbulating mass or volume of air within which much of the energy of the moving air might be wastefully spent.

In addition to the foregoing and of equal significance, the curvature of the outer edge portions X of the vanes is aerodynamically designed with respect to the longitudinal and radial disposition of the reactive surfaces of the vanes to cause and induce the moving air reacting thereon and moving across those surfaces to commence to flow longitudinally and radially outwardly relative thereto and to slip radially outwardly therefrom as soon as the vanes advance rearwardly and thence laterally outwardly and rearwardly through the wind gate portion of the construction. That is, the curved outer portions X of the vanes induce the moving air reacting upon them to slip circumferentially and radially outward from the vanes when the vanes reach those rotative positions where they cease to contain and commence to release the moving air acting upon them. The above noted induced longitudinal and radial outward slippage of working or moving air from the outer edge portions of the vanes draws and/or causes the air reacting upon the radial inner portions of the vanes to move longitudinally and radially outward relative thereto. and to continue to work upon the vanes.

The induced slippage of the working or moving air from engagement with the vanes is highly important since the working or moving air slipped from each vane is directed longitudinally and radially outward and into forceful reactive engagement on the reactive surface of the vane of the other rotor preceding or in advance of it. The movement of air slipped from engagement with a vane on one rotor into engagement with a vane on the other rotor is clearly illustrated by phantom lines and by flow indicating arrows in FIG. 5 of the drawings.

It will be noted that in the case of a wind-powered prime mover having a single rotor, the working or moving air acting on each vane of the rotor commences to flow radially outward and to slip from working engagement with the rotor as soon as that vane passes the forward inner quarter of its rotary path and is lost and unable to perform any further useful work after the vane reaches the lateral radial plane of the rotor.

In the case of the instant invention, it is to be noted that the meshed vanes of the two rotors cooperate to contain and hold the air in the wind gate defined by the construction forward of the central lateral vertical plane of the gate captive and in full effective working engagement on and with the vanes as the meshed vanes of the two rotors advance laterally inwardly and rearwardly to and as they advance rearwardly and laterally outward from the central lateral vertical plane of the wind gate, whereby far more energy of the moving air is transmitted into the rotors than is attained by one or a pair of single rotor wind-powered prime movers with rotors of like size or capacity.

Further, the moving air slipped and moving radially outward from the vanes in the manner set forth above, as the vanes advance rearwardly through the air gate portion of a construction, is directed longitudinally and radially outward from each vane of each rotor in forceful direct reactive engagement onto the radial inner portions of the reactive surface of the vane of the other rotor in advance of or preceding it. The air slipped from each vane of each rotor and engaging the reactive surface of the preceding vane on the other rotor follows that air which is already reacting upon said preceding vane and which, as noted above, is already moving longitudinally and radially outward relative to it and from the outer edge portion thereof. Thus, a continuous and positive movement of air, substantially free of stalled and turbulating, energy wasteful air, is assured. Further, and of great significance and importance, the working air caused to slip from the vanes of each rotor and into reactive engagement with the preceding vanes of the other rotor put that air to direct useful work a second time, whereby a notable portion of the energy of the moving air which might otherwise be lost is imparted into and/or collected by the rotors.

In accordance with the foregoing, the working or moving air advancing into the wind gate of my structure first reacts upon the vanes of the two rotors and as the air moves rearwardly through the wind gate portion of the structure, that air reacting upon the vanes of each rotor is caused to move from reactive engagement therewith and into reactive engagement with the vanes of the other rotor as it moves rearwardly through the wind gate and before it is exhausted by or moves rearwardly from the structure. Thus, the structure that I provide is or can be said to be a double acting or compound wind-powwered prime mover wherein the working or moving air is put to useful work not once, but twice.

It has been determined that the aerodynamic design of the vanes of the rotor is subject to considerable variation. In practice, the longitudinal and diametric extent of the rotors, the mean anticipated velocity of the wind to be encountered and the sought for means operating speed of the structure are principal factors upon which the foil shape or aerodynamic design of the rotors must be established. In all such cases, the design which is likely to result will, for practical reasons, involve a compromise design. Accordingly, in the drawings, I have not sought to illustrate any one particular and/or optimum rotor design. Rather, I have elected to illustrate what I have perceived to be one rotor design which might fairly characterize a suitable design for one size of prime mover embodying my invention for use under one set of environmental circumstances.

In a dual rotor wind prime mover of the same general character that I provide, in which vanes are not longitudinally helically pitched as they are in my invention and where the vanes are not meshed sufficiently deep to attain any notable degree of secondary reaction, that is, any notable degree of air slipping from engagement fro one vane to another, the rotors will less effectively and efficiently utilize the energy of the moving air and will turn less rapidly, with less force than do the rotors in my invention.

Such another and different structure is little or no more than two independent paddle wheel like rotors which do not coact in any manner that can be said to result in a compound or dual action with respect to the moving air.

In my invention, the meshing of the vanes of the two rotors and the compound or dual action which is attained is made possible by the longitudinal helical pitch of the vanes of the rotors and/or by the uniquely curved outer edge portions of the vanes of the rotors which work to keep the air advancing to, through and from the wind gate, between the rotors, in motion; that is, by helically pitching the vanes and/or the outer edge portions thereof as shown and described above, my related rotors do not act or tend to stop the movement of advancing air through the wind gate, but rather, serve to keep and maintain that air in motion and to direct it in and through the wind gate in a manner that results in a highly effective and efficient transfer of energy carried by the air into the rotors.

The power transmission or drive means D that I provide includes the above noted driven wheel 24 carried by the shaft 23 at the center of the turn table T, the drive gear wheels 46 at the lower ends of the rotor R, as shown in the drawings and described above and further includes power transmission means engaged with and between those wheels. The power transmission means is shown as an elongate, endless gear belt 49 engaged about and between the pair of wheels 46 and the wheel 24 in driving engagement therewith. Since the pair of rotors R and their related wheels 46 are counterrotating, the two portions of the gear belt 49, extending between the wheels 46, must be crossed relative to each other and one of those crossed portions must be engaged with the driven wheel 24 in order that the rotors turn as required and so that the wheel 24 and its shaft 23 are driven and rotated in a desired direction.

It will be apparent that when the rotors are turned by moving air, the drive means D that I provide effectively drives the generator G, which is drivingly connected with the gear box B of the means D, and electric power is generated.

The wind or air flow control means C carried by the table T and related to the rotors R serves to manage and control the movement of air into and through the wind gate defined by the structure, between the rotors R. In operation and practice, it is desired that the means C operate to collect light air or wind and to direct it into the wind gate whereby the rotors can be caused to rotate at a sufficiently high for effectively generating electricity under prevailing light air conditions and to throttle or restrict strong winds or heavy air flowing through the wind gate so that the speed of rotation of the rotors can be limited to speed at which the generator is operated efficiently and where the speed of rotation of the rotors R is limited to below that speed where dynamic forces encountered throughout the construction are likely to exceed the structural limitations of the unit U.

The means C includes a pair of laterally spaced, elongate vertically extending shrouds 60 coextensive with the vertical longitudinal extent of the pair of rotors and positioned at the opposite outer sides of the pair of rotors. The shrouds 60 have front and rear portions terminating at and/or defining vertical front and rear edges 61 and 62. The front portions of the shrouds have laterally inwardly disposed vertically extending concaved or semi-circular surfaces 63 which are slightly greater in radial extent than the radial extent of the rotors and which are less than 180° and preferably about 150° in circumferential extent. The surfaces 63 establish recesses in which the outer portions of their related rotors are engaged with the outer edges of their vanes in free running clearance with the surface 63, as clearly shown in FIG. 5 of the drawings. The rear portions of the shrouds have exterior surfaces 64 which, as shown, can have convex or semi-circular rear portions extending laterally outwardly and forwardly from the rear edge 62.

The front portion of the shrouds 60 project forwardly from the rear portions thereof and from the transverse vertical plane of the unit U on which the fronts of the rotors occur. The front portions have laterally inwardly and rearwardly extending laterally inwardly and forwardly disposed inner surfaces 65 which extend from their front vertical edges 61 to inside vertical edges 66 defined by the junction of the surfaces 63 and 65 and have outer surfaces 67 extending between and joining the edges 61 and the forward edges or portions of the exterior surfaces 64.

The inner surface 65 of both shrouds 60 are shown as being slightly convex and the surfaces 67 thereof are shown as being flat. The pair of laterally spaced, laterally inwardly and forwardly disposed inner surfaces 65 cooperate to normally define a forwardly and rearwardly opening forwardly and laterally outwardly divergent, vertically extending, air collecting and concentrating trough or funnel-like mouth.

The upper ends of the shrouds 60 have horizontal laterally inwardly projecting upper mounting plates 70 pivotally bearing supported on and about the upper portions of the shafts 34 between the header 35 and the upper ends of their related rotors R (see FIG. 2 of the drawings) and have horizontal laterally inwardly projecting lower mounting plates 71 rotatably supported on related cones 30 on the turn table T by means of bearing means between the cones and the lower end of the rotors and as clearly shown in FIG. 4 of the drawings. The bearing means 73 includes inner annular rings 74 engaged about the cones 30, outer annular rings 75 on the plates 71 and anti-friction bearings 76 engaged with and between the rings 74 and 75.

In addition to the above, the outer rings 75 are shown as having semi-circular quadrant gears 77 fixed to their inside portions. The quadrant gears are engaged by drive worm gears 78 carried and driven by motors 79 mounted atop the turn table T. The quadrant gears, worm gears and motors 77, 78 and 79 are intermittently operable and function to rotate the shrouds circumferentially about and relative to their pivotal axes and about the rotors, as indicated in dotted lines in FIG. 5 of the drawings. The motors 79 can be electric or hydraulic and can be operated synchronously or independently, as desired or as circumstances require.

The gears 77 and 78 and the motors 79 are but one typical form of operating means 0 that can be provided to effect selected intermittent controlled relative counter rotation or turning of the shrouds 60 relative to their related rotors and to each other. Operation of the means 0, whether in the form shown or in some other suitable form, can be operated and controlled by a manually operable control means and power supply; a power supply and control means which operates in response to wind velocity, as determined by an anamometer 80 mounted on the header 35; or can be operated and controlled by power supply and control means which are responsive to the turning speed and/or the power output of the generator G.

Since the nature and form of the operating means 0 can vary widely, that form of operating means 0 which is adapted and used can and will be left as a matter of choice. Further, since the nature and form of the power supply and control means of or for the means 0 depends upon the form of means chosen to be used, further detailed illustration and/or description of any particular form of the means 0, control means and power supply need not and will be presented.

With the means C and a suitable related operating means 0, as shown and described, it will be apparent that by controlled pivoting or rotating of the shrouds 60, the inner surfaces 65 and edges 66 of the pair of shrouds can be moved laterally inwardly and outwardly relative to each other to decrease and increase the opening defined by the shrouds and to thereby act as a valving means to throttle down or reduce the flow of air therebetween when the air is heavy or blowing fast and/or hard and to open to a maximum extent and to dispose the surfaces 65 in such a manner as to collect, concentrate and direct a greater or increased flow of air to the rotors R when the air is light or blowing slow and/or soft.

When the unit U is out of service and/or in storm conditions when the unit should be shut down, the shrouds 60 can be moved to a closed position as shown in dotted lines in FIG. 5 of the drawings. When the shrouds are in closed position, as noted above, the edges 61 thereof are substantially joined and the surfaces 67 diverge laterally outwardly and rearwardly in such a manner that the front of the unit U has a central straight vertical leading edge portion and rearwardly divergent outer surfaces which will cut and separate strong advancing winds and eliminate or greatly reduce possible wind damage to the unit.

In practice, the shrouds 60 are hollow fabricated structures with sheet metal skins refining the several surfaces 63, 64, 65 and 67 thereof. The concave surfaces 63 are established of perforated sheet metal which establishes communication between the recesses in and through which the vanes of the rotors move and the interiors of the shrouds. Due to the longitudinal helical pitch of the vanes, as each vane moves circumferentially outwardly and forwardly into engagement in the recess of its related shroud, its leading end portion advances into the confines of the shroud as the trailing end portion of the vane preceding it moves forwardly and laterally inward from the confines of the shroud. Accordingly, and with the structure that I provide, air carrried by the vanes advancing into the confines of the recesses in the shrouds is free to move through the perforations in the rear portions of the surfaces 63 and into the interior of the shrouds, thus relieving any positive pressure in the recesses, between adjacent vanes within the recesses which might slow the rotor. The air moved into the recesses of the shrouds by the vanes in the manner set forth above flows through the shrouds and exits the shrouds through the perforations at the forward portions of the surfaces 63, in advance of and following the vanes moving thereby whereby any minus pressures between those vanes and within the recesses which might tend to hold back and slow movement of the vanes and turning of the rotors is relieved. Thus, perforations in the rotor accommodating recesses in the shrouds establish effective pressure releasing and/or balancing means which allow the vanes of the rotors to move substantially through the vanes.

Finally, and in addition to the foregoing, the unit U that I provide can and is preferably provided with turning means N to turn or rotate the turn table T so that the front of the wind gate portion and/or the funnel-like mouth thereof, defined by the means C, are directed and disposed forwardly and into the prevailing wind. One suitable and preferred form of the means N is shown in FIG. 3 of the drawings. The means N shown in the drawings includes a ring gear 90 fixed to and carried by the plate 23 at the center of the turn table T. A reversible electric motor 91 is mounted in the platform structure P adjacent or in close proximity to the gear 90. The motor 91 turns a worm gear 92 which is in driving engagement with the ring gear 90. The motor can be operated by manually operable switching means in a power supply for the motor (not shown) or can be under control of a suitable electric circuit (not shown) which includes or is connected with and under control of a wind vane 93. Such a wind vane can, as shown in FIG. 1 of the drawings, be mounted on the header 35 at the top of the unit U.

Whether operated by and/or under control of manually operable switching means or an automatically controlled means of the nature and character noted above, it will be apparent the means N is operable to effectively rotate the turn table to direct and maintain the front of the unit directed into the prevailing wind.

In practice, to vary the speed of rotation of the rotors and the efficiency of my invention under one wind speed or to maintain the speed of rotation of the rotors substantially constant when the speed of the wind increases or decreases, the lateral spacing of the rotors and the extent to which the vanes on each rotor extend into the spaces defined by adjacent pairs of vanes on the other rotor can be adjusted to increase or decrease the wind throttling effect of the adjacent pair of rotors. In addition to the above, by increasing or decreasing the wind throttling effect of the rotors, the freedom and rate at which the wind moves over and across the vanes can be varied. By controlling that flow of wind, the aerodynamic efficiency of the structure can be finely tuned or adjusted.

Figure 8:
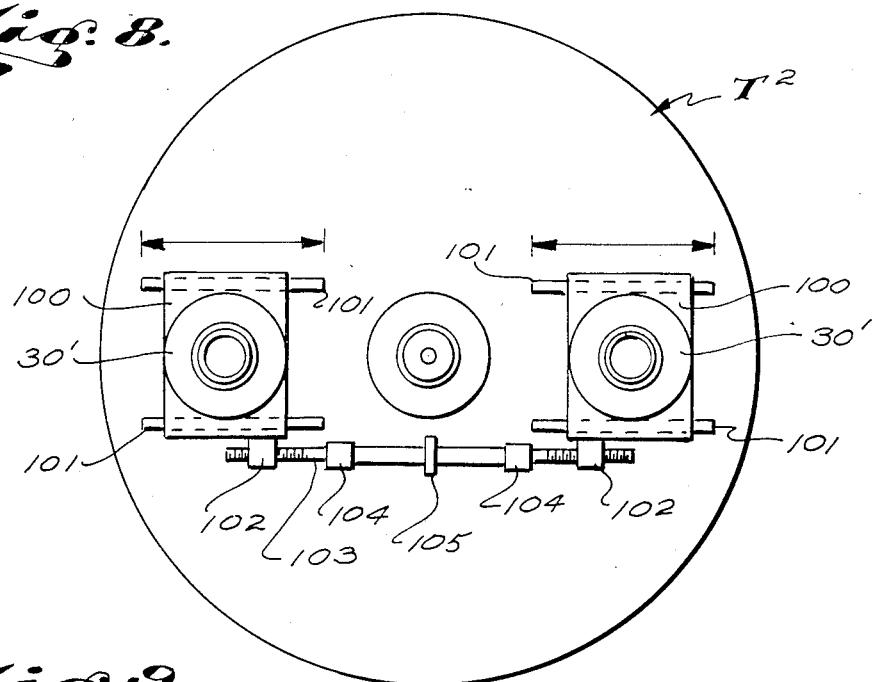
FIG. 8 is a diagrammatic plan view of the turn-table of a modified form, of my invention.
Figure 9:
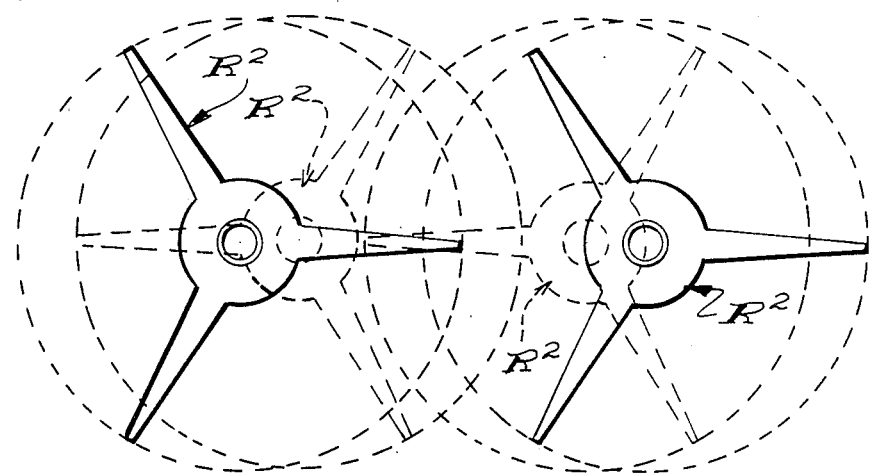
FIG. 9 is a diagrammatic cross-sectional view through the rotors of the modified form of the invention.
Figure 10:
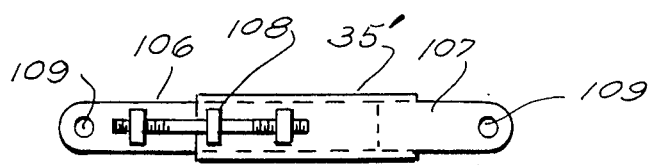
FIG. 10 is a diagrammatic plan view of the header in the modified form of my invention.

In accordance with the above, in FIGS. 8, 9 and 10 of the drawings, I have diagrammaticallly illustrated a modified form of my invention wherein the rotors are shiftable laterally relative to each other. As shown in FIG. 8 of the drawings, the pair of laterally spaced cones 30' for the rotor supporting columns (not shown) have truck-like bases 100. The truck-like bases 100 are shiftably carried on tracks 101 atop the turn-table $T^2$. The bases 100 have threaded blocks 102 fixed thereto and through and between which a tie rod 103 is threadedly engaged. The rod 103 is carried by pillow blocks 104 atop the turn-table and has a manually engageable hand wheel 105. By turning the wheel 105, the rod 103 is turned and operates to move the bases 100 and their related cones 30', columns and rotors $R^2$ laterally inwardly or laterally outwardly relative to each other, as desired.

The effect of such lateral adjustment of the rotors $R^2$ is diagrammatically illustrated in FIG. 9 of the drawings.

In the above modified form of my invention, the header 35' of my construction must be laterally adjustable to maintain the rotors $R^2$ parallel. In FIG. 10 of the drawings, I have shown the header 35' comprising two elongate longitudinally shiftable sections 106 and 107 and as including a jackscrew 108 engaged with and between parts on the sections 106 and 107 whereby turning the screw 108 shifts the sections 106 and 107 longitudinally relative to each other. The outer free ends of the sections 106 and 107 have openings 109 to receive the upper spindles 34 of their related rotor assemblies.

It will be apparent that with the above header structure or with other equivalent structure, the lateral spacing of the upper ends of the rotors can be adjusted to maintain the rotors parallel when the lower ends thereof are shifted laterally relative to each other. It has been determined that the larger unit U is, the lighter and more efficient the rotors can be made with respect to their effective surface area. Accordingly, it is contemplated that the unit U should be made as large as is possible and practical. In practice, in the form of my invention tion shown in the drawings and described above, it is believed and understood that the rotors R can be made to be approximately fifty feet in vertical or axial extent and in excess of twenty-five feet in diameter without exceeding practical limits. With rotors of such size, it will be apparent that the unit U can be made to receive and be effectively worked upon by large quantities of wind or moving air and to generate substantial amounts of electrical power.

While I have shown and described my invention as an electrical power generating unit, it will be apparent that if desired, it can be used to drive various mechanical devices other than a generator. For example, a fluid pump or a power transmission for a milling apparatus or the like might be substituted for the generator G without departing from the broader aspects and spirit of my invention.

In FIGS. 5, 6 and 7 of the drawings, the outer edge portions of the vanes V are curved radially outwardly and forwardly in the direction of rotation. This vane configuration is particularly suited for effective operation of my invention in environments where hugh wind velocities are encountered. In practice, in environments where low wind velocities are normally encountered, the effectiveness of my invention can be enhanced by reversing the curvature of the outer edge portions of the vanes and so that they curve radially outwardly and rearwardly with respect to the direction of rotation. Accordingly, the form of the vanes shown in FIGS. 5, 6 and 7 of the drawings is but one typical preferred form of the vanes that can be used in carrying out the invention.

Having described only one typical preferred form and application of my invention, I do not wish to be limited to the specific details herein set forth, but wish to reserve to myself any modifications and/or variations that might appear to those skilled in the art and which fall within the scope of the following claims.

Having described my invention, I claim:

1. A wind-powered prime mover comprising a platform, a power shaft rotatably carried by the platform, a horizontal turn table rotatably supported atop the platform, a pair of elongate laterally spaced vertical columns projecting up from the turn table, a pair of elongate vertical rotors about and rotatably carried by the pair of columns and defining a vertically extending forwardly and rearwardly opening wind gate opening therebetween, a transmission means is engaged with and between the rotors and shaft and causes counter rotation of the rotors and rotation of the shaft when the rotors are drivingly turned, said rotors include a plurality of circumferentially spaced longitudinally extending radially outwardly projecting vanes which are positioned so that the vanes of each rotor occur between adjacent pairs of vanes of the other rotor when the rotors turn and the vanes advance rearwardly through the wind gate opening, said vanes have curved trailing reactive surfaces curved radially outwardly and circumferentially in the direction of rotation of the rotors and disposed forwardly, laterally, inwardly and rearwardly as they advance laterally inwardly, rearwardly and laterally outward relative to the wind gate opening; and air flow control means comprising a pair of laterally spaced shrouds positioned about the outer portions of the pair of rotors, said shrouds have laterally inwardly opening recesses freely rotatably accommodating the outer portions of the rotors and vanes and have vertical forward edges that define the front of the wind gate opening, the pairs of shrouds have wind directing surfaces projecting forwardly and outward from said edges and which direct air laterally inwardly and rearwardly to said wind gate opening.

2. The wind-powered prime mover set forth in claim 1 which further includes bearing means supporting the shrouds for pivotal movement about the rotors and shroud control means to pivot the shrouds to move the forward edges thereof laterally inwardly and outwardly relative to each other and to decrease and increase the lateral extent of the wind gate opening.

3. The wind-powered prime mover set forth in claim 1 which further includes bearing means supporting the shrouds for pivotal movement about the rotors and shroud control means to pivot the shrouds to move the forward edges thereof laterally inwardly and outwardly relative to each other and to decrease and increase the lateral extent of the wind gate opening, and drive means to rotate the turn table to dispose the open front of the wind gate opening toward prevailing wind and including a driven part on the turn table, a drive part engaging the driven part and a reversible power drive means driving the drive part.

4. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening.

5. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening, and so that the leading end of each vane on each rotor moves into position between its related pair of adjacent vanes on the other rotor as the trailing end of the preceding vane on said other rotor moves out of position between its related pair of adjacent vanes on each of said rotors as the vanes advance through said wind gate opening.

6. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening, and bearing means pivotally supporting the shrouds concentric with the rotors and shroud control means to pivot the shrouds to move the forward edges thereof laterally inwardly and outwardly relative to each other and to decrease and increase the lateral extent of the wind gate opening.

7. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening, and so that the leading end of each vane on each rotor moves into position between its related pair of adjacent vanes on the other rotor as the trailing end of the preceding vane on said other rotor moves out of position between its related pair of adjacent vanes on each of said rotors, and bearing means pivotally supporting the shrouds concentric with the rotors and shroud control means to pivot the shrouds to move the forward edges thereof laterally inwardly and outwardly relative to each other to decrease and increase the lateral extent of the wind gate opening.

8. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening, and bearing means pivotally supporting the shrouds concentric with the rotors and shroud control means to pivot the shrouds to move the forward edges thereof laterally inwardly and outwardly relative to each other and to decrease and increase the lateral extent of the wind gate opening, and drive means to rotate the turn table to dispose the open front of the wind gate opening toward prevailing wind and including an annular driven part on and concentric with the central axis of the turn table, a drive part engaging the driven part and a reversible power drive means driving drive part.

9. The wind-powered prime mover set forth in claim 1 wherein said vanes of the rotors are circumferentially and longitudinally pitched so that the direction of wind impinging upon the trailing reactive surfaces thereof is made to flow longitudinally and radially thereacross as the vanes move through the wind gate opening, and so that the leading end of each vane on each rotor moves into position betweenits related pair of adjacent vanes on the other rotor as the trailing end of the preceding vane on said other rotor moves out of position between its related pair of adjacent vanes on each of said rotors, and bearing means pivotally supporting the shrouds concentric with the rotors and shroud control means to pivot the shrouds to move the forward edges thereof laterally inwardly and outwardly relative to each other to decrease and increase the lateral extent of the wind gate opening, and drive means to rotate the turn table to dispose the open front of the wind gate opening toward prevailing wind and including a driven wheel on and concentric with the turning axis of the turn table, a drive part engaging the driven part and a reversible power drive means driving the drive part.

10. A wind-powered prime mover comprising a pair of elongate laterally spaced rotatably supported vertical rotors defining a vertically extending wind gate opening with an open front disposed toward prevailing wind and an open rear opening in the direction of the wind, drive wheels on the rotors, a bearing supported power shaft spaced from the rotors, a driven part on the shaft, power transmission means engaged with and between the wheels and the shaft causing synchronized counter rotation of the rotors and turning of said shaft, each of said rotors has a plurality of elongate, longitudinally extending radially outwardly and circumferentially curved radially outwardly projecting vanes, the vanes on each rotor occur freely between adjacent pairs of rotors on the other rotor when the rotors counter rotate and the vanes advance rearwardly through said wind gate opening and so that the air of the wind moving into said wind gate opening moves into working engagement with the vanes advancing into and through said wind gate opening and slips radially outward from the vanes as the vanes advance from within the wind gate opening and so that air slipping from the vanes of each rotor within the wind gate opening is directed onto and works upon the vane on the other rotor which is in advance thereof before that vane is advanced out of the wind gate opening and wind gate control means defining the open front of the wind gate opening collecting and directing wind into said wind gate opening, said control means includes a pair of laterally spaced shrouds at the opposite outer sides of the pair of rotors, said shrouds have laterally inwardly opening recesses freely accommodating the outer portions of their related rotors and have forwardly and laterally inwardly disposed wind collecting surfaces.

11. The wind-powered prime mover set forth in claim 10 wherein the vanes of the rotors have radially outwardly and circumferentially more acutely curved outer edge portions curved circumferentially in the direction of rotation of the rotors and leading the vanes into working reactive engagement with air of the wind advancing into and through the wind gate opening and inducing radial outward flow and slippage of air from the vanes before the vanes advance from within the wind gate opening and so that air slipping outward from the vanes of each rotor within the gate opening is directed to and reacts on the vane of the other rotor which next precedes it within the wind gate opening.

12. The wind-powered prime mover set forth in claim 1 wherein the columns have truck-like bases engaging the turn table and shiftable laterally relative to each other so that the columns and the rotors rotatably carried thereby are shiftable laterally relative to each other and to the turntable to selectively increase and decrease the extent to which the vanes of each rotor project between adjacent pairs of vanes of the other rotor when the rotors turn and to increase and decrease the wind throttling effect of the related pair of rotors and to adjust and set the speed of rotation of said rotors.

* * * * *